United States Patent [19]

Ahles, deceased

[11] 4,150,385
[45] Apr. 17, 1979

[54] POINT RECORDER

[75] Inventor: Alfred Ahles, deceased, late of Nuremberg, Fed. Rep. of Germany, by Ingeborg Ahles, executor

[73] Assignee: Metrawatt, A. G., Nuremberg, Fed. Rep. of Germany

[21] Appl. No.: 777,923

[22] Filed: Mar. 15, 1977

[30] Foreign Application Priority Data

Mar. 16, 1976 [DE] Fed. Rep. of Germany ....... 2610899

[51] Int. Cl.$^2$ .................... G01D 15/04; G01D 15/16
[52] U.S. Cl. .................................... 346/79; 346/113
[58] Field of Search ......................... 346/79, 113, 136

[56] References Cited

U.S. PATENT DOCUMENTS

| | | | |
|---|---|---|---|
| 1,124,820 | 1/1915 | Simonsson | 346/79 X |
| 1,568,703 | 1/1926 | Warren | 346/79 X |
| 1,568,704 | 1/1926 | Warren | 346/79 |
| 1,964,409 | 6/1934 | Whittaker | 346/79 |
| 2,392,876 | 1/1946 | Potter et al. | 346/79 |
| 3,048,848 | 8/1962 | May | 346/79 X |
| 3,370,300 | 2/1968 | Gilovich et al. | 346/113 |
| 3,396,405 | 8/1968 | Whitmore | 346/79 X |
| 4,032,926 | 6/1977 | Hale | 346/79 |

Primary Examiner—George H. Miller, Jr.
Attorney, Agent, or Firm—Michael J. Striker

[57] ABSTRACT

A point recorder has a clock that periodically generates an electrical impulse that is operative through a speaker-type electromagnet to displace a printing element from a holding position wherein an indicator moveable in an indicating direction is spaced from a recording strip to an imprinting position wherein the indicator is pressed against the recording strip. A pawl carried on the printing element is engageable in teeth on a drive roll over which the recording strip is spanned so that each time the printing element moves between its two positions the recording strip is incrementally advanced. The printing element has a bar which presses a needle constituting the indicator against the paper strip where it is spanned over the drive roller so as to record as a point or dot the position of the indicator therealong.

5 Claims, 2 Drawing Figures

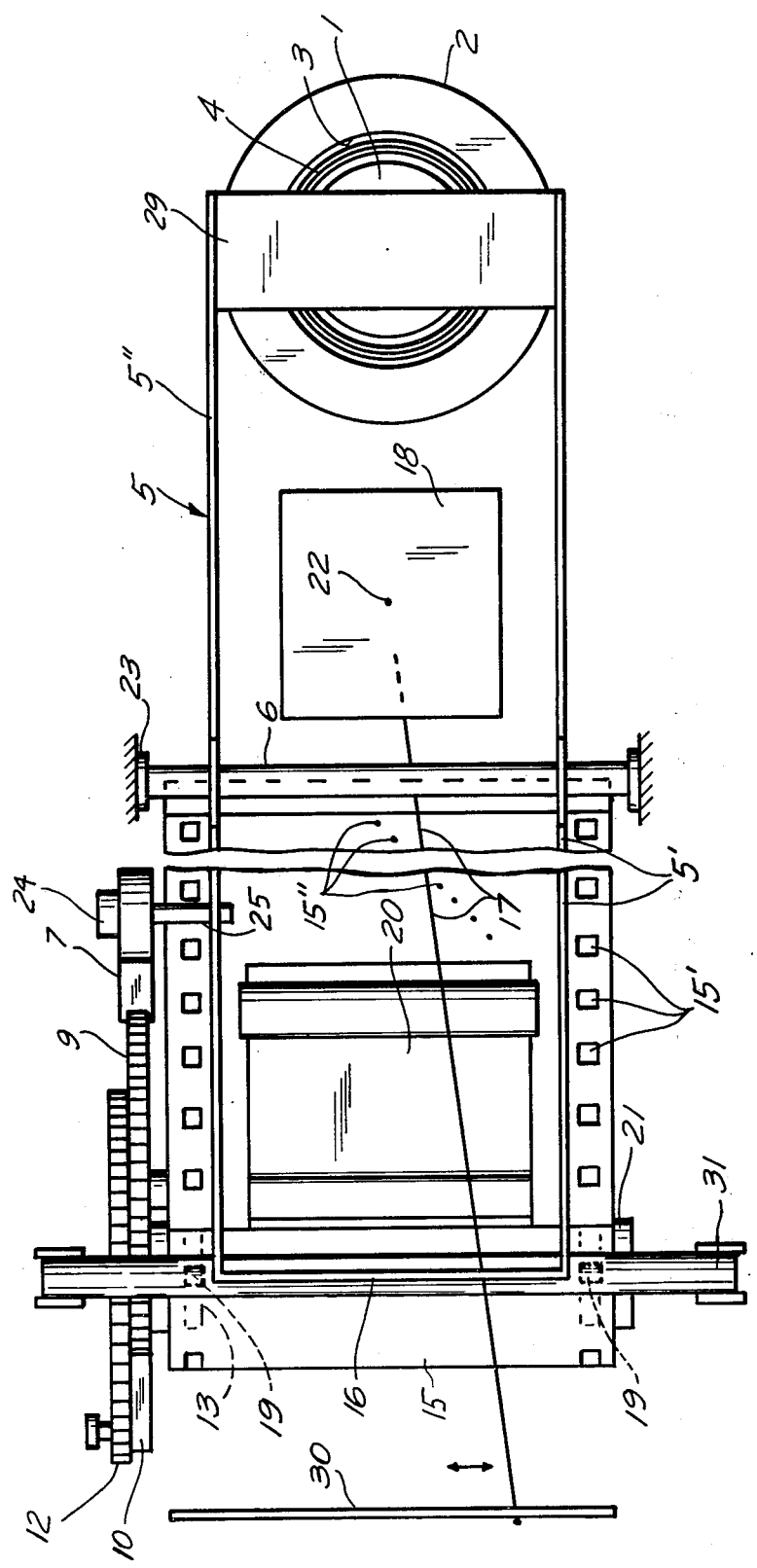

POINT RECORDER

BACKGROUND OF THE INVENTION

The present invention relates to a recorder. More particularly this invention concerns an apparatus for periodically recording on a recording or registering strip the position of an indicator moveable in an indicating direction.

It is frequently necessary to prepare a permanent record of fluctuations in some parameters such as temperature, pressure, voltage, or virtually any other measureable phenomenon. To do this an apparatus is provided which periodically records on a recording strip or the like the position of an indicator which is movable in an indicating direction and whose position shows the variable being measured. Thus at regular intervals the position of the indicator is recorded so that a permanent record of the phenomenon being measured with respect to time is obtained.

Such an arrangement is known having an electromagnet which is regularly and periodically actuated so as to press the indicator against the recording strip and make a mark thereon, normally by interposition of a inking ribbon or the like. Synchronously with this action a stepping motor is operated so as to advance the strip past the marking location by an increment. Thus two separate drives or actuating mechanisms are used, one for the printing element which presses the indicator against the paper strip and another for advancing the paper strip.

It is also known an other arrangement with a synchronous motor actuate both, the printing element and the advance of the paper strip. But this arrangement needs a complicate gear and much driving energy.

SUMMARY OF THE INVENTION

It is an object of the present invention to provide an improved recorder.

Another object is the provision of an improved apparatus for periodically recording the position of an indicator.

Yet another object is to provide such an apparatus which is extremely simple in operation and inexpensive to manufacture.

Further on it is an object to provide an apparatus which needs extremely few driving energy.

These objects are attained according to the present invention in a recording apparatus provided with clock means that periodically generates an electrical impulse that serves via actuating means to displace a printing element from a holding position wherein the indicator is spaced from the recording strip to an imprinting position pressing the indicator against this strip. Coupling means is provided which includes a pawl connected between the printing element and a roller constituting part of feed means for displacing the strip so that each time the printing element is moved from the holding position to the imprinting position the drive roller for the strip is angularly displaced through a predetermined angular increment. Thus a single actuator serves both to strike the indicator against the paper strip and to advance the paper strip by an increment.

According to another feature of this invention the actuating means is electromagnetically operated. More particularly, this actuating means includes a permanent magnet and a coil, the latter being connected to the clock. The coil may be carried as in a dynamic loudspeaker on the moving element, here the printing element. In such an arrangement normally a spring or a counterweight at a pivoted lever holds the printing element in the holding position and by energizing the moving coil the printing element drops onto the indicator and recording strip.

In accordance with yet another feature of this invention the clock means can include a high-frequency oscillator. Alternately, the standard fixed-frequency alternating-current line which in the U.S.A. normally delivers 110 volts or 220 volts at 60 cycles per second is used. In both cases a frequency divider is used which may be of the adjustable or variable type so that the rate of the impulses can be changed.

According to further features of the present invention a supply roll of the recording strip is carried on another roller that is connected via gearing to the drive roller which itself has teeth that engage in edge perforations of the recording strip. The printing element is provided with a bar that extends parallel to the rotation axis of the drive roller and also parallel to the direction of displacement of the indicator. This drive element thus drops down on the indicator to press the same tightly against the paper running over the drive roller each time the clock means puts out a pulse. When the drive roller is of relatively small diameter and the indicator is relatively thin, normally being formed of a spring-steel wire, this tangential contact between the indicator and drive roller will effectively give point contact to form a dot on the recording strip.

Thus the system according to the present invention is characterized by extreme simplicity and sureness in operation. Failure is unlikely, and absolute synchronization between the advance of the paper strip and operation of the printing element is assured due to the common drive or actuator therefor. Similarly, changing of the recording rate is an extremely simple matter since only one drive is provided, so that whether the indicator is pressed against the strip once a second or once every hour, it is only necessary to readjust the clock so as to change both the incremental advance and reciprocation rate of the printing element. Because the system needs only periodically a short driving impulse, the driving energy is very small.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWINGS

FIG. 2 is a top view of the apparatus shown in FIG. 1.

SPECIFIC DESCRIPTION OF THE PREFERRED EMBODIMENT

Figure 1:
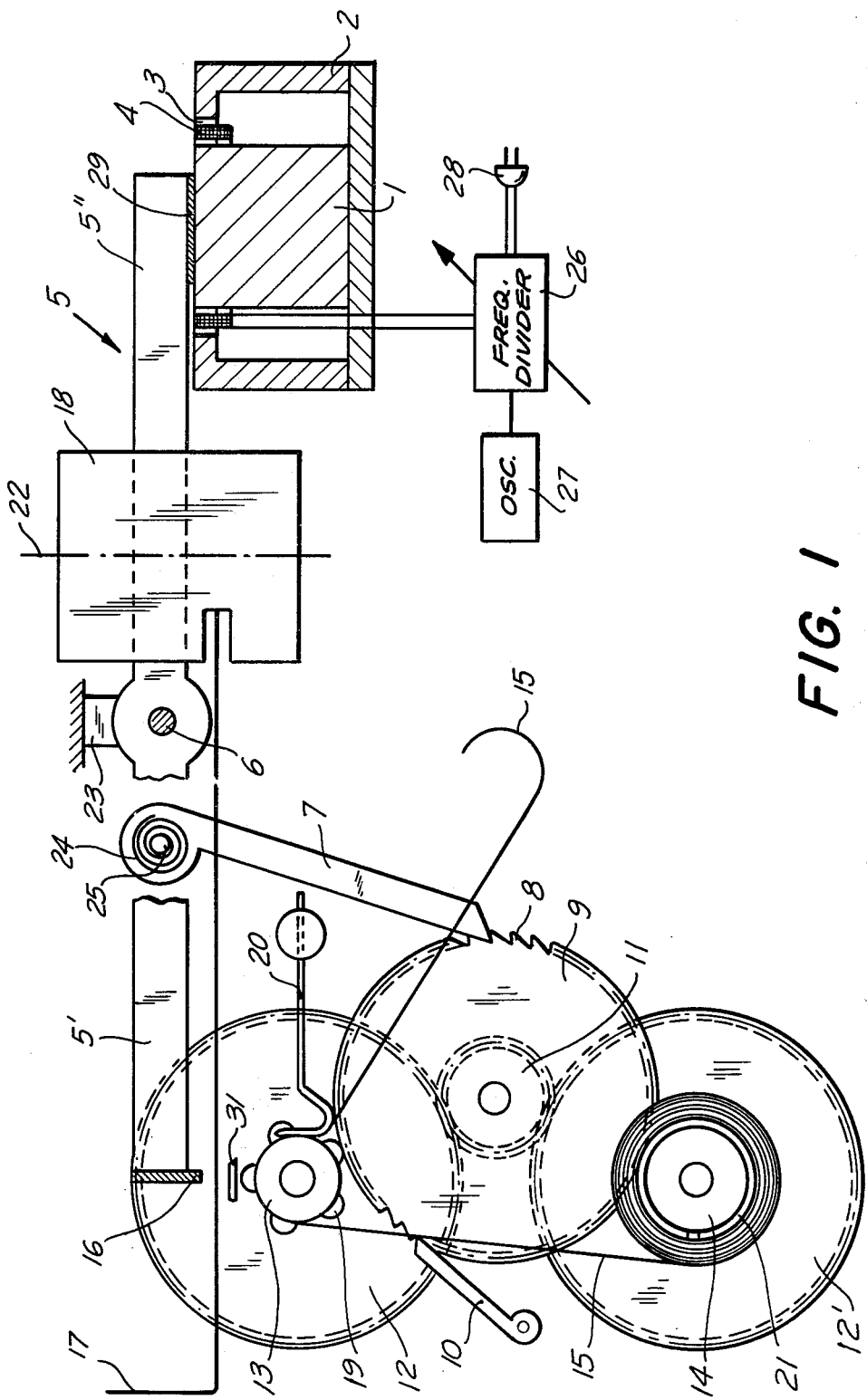
FIG. 1 is a vertical section partly in diagrammatic form through the apparatus according to this invention.

The apparatus shown in FIGS. 1 and 2 has an actuator of the type used in a dynamic loudspeaker and comprising a cylindrical and upright permanent magnet 1 surrounded by a cup 2 so as to form an air gap 3 in which is vertically displaceable a moving coil 4 carried on one end of a printing element 5. A clock which is constituted basically as a frequency divider 26 of variable type which may be connected either to an oscillator 27 or to the line as shown at 28 is connected to this coil 4 in order periodically to energize it with a direct-current electrical pulse.

The printing element 5 is formed generally as a bow or open frame as shown in FIG. 2 and is pivoted about a horizontal axis 6. It has a pair of front arms 5' between which extends a printing bar 16 extending parallel to the pivot 6 and a pair of rear arms 5" between which extends a girder 29 which keeps the coil 4 and so can be attracted and repelled by the electromagnet arrangement 1 - 4. By energization of the coil 4 with current of the right polarity the permanent magnet 1 repels the girder 29. The element 5 drops back in the indicated holding position, that is with its arms 5" down and arms 5' up, by the weight of the arms 5" or the force of a spring. The magnet 1 - 4 is fixed and the pivot axle 6 is also fixed on tabs 23.

A strip 15 of recording tape is provided as shown in FIG. 2 at its edges with perforations 15' and extends from a supply roll 14 over a drive roll 13. A pawl 7 is pivoted at 25 on one of the front arms 5' and is urged by means of a torsion spring 24 into sawteeth 8 formed on the periphery of a gear wheel 9. Coaxially fixed to this gear wheel 9 is a pinion 11 meshing with a gear wheel 12 that rotates the drive roller 13 and with a gear wheel 12' that rotates the supply roll 14. A slip clutch 21 serving to tension the paper strip 15 is provided on the supply roll 14 and the drive roll 13 has projections or teeth 19 that engage through the perforations 15' so as positively to engage this strip 15. A leaf spring 20 presses the strip 15 tightly against the roller 13 so that at least three of the perforations 15' are meshed with three of the teeth 19 and slippage of the strip 15 on the roller 13 is completely ruled out.

An inking ribbon 31 extends horizontally between the printing bar 16 and the upper surface of the roller 13 over which the strip 15 is tightly spanned. The drive for this ribbon 31 is synchronous with and operated by the rotation of the pinion 11.

A meter 18 which may measure electricity, pressure, temperature or virtually any other measureable phenomenon, has a spring-steel indicator needle 17 that can pivot about an upright axis 22 and has an end adjacent a scale 30. Thus at any time the phenomenon being measured can be read off against the scale 30.

The device operates as follows:

Each time a pulse is fed to the coil 4 the magnetic field of the magnet 1 repels the coil 4 and the element 5 pivots about its axle 6. In absence of a pulse the arms 5" are much heavier than the arms 5' so that absent attraction of the girder 29 will automatically drop back.

The repelling of the coil 4 causes a dropping of the bar 16 which presses the elastically deformable indicator needle 17 against the ribbon 31 and therethrough against the relatively small diameter drive roller 13. A dot as shown at 15" is therefore made on the paper strip 15. The frequency with which this happens is determined by the setting of the frequency divider, whether it is merely dividing the frequency of the line voltage received at 28 or the high-frequency of the oscillator 27.

As the arms 5' drop to form a mark 15" on the strip 15 the pawl 7 will similarly push down against one of the teeth 8 and rotate the wheels 9 and 11 clockwise as shown in FIG. 1. This will rotate both of the wheels 12 and 12' counterclockwise and advance the tape or strip 15 a predetermined increment. Thus each time the bar 16 drops the strip 15 is advanced, so that by the time the bar 16 has come down into contact with the roller 13 through the indicator 17, ribbon 31, and strip 15, a new section of the tape 15 will be exposed. The result is a dot marking 15" on the surface of the tape 15 at a location corresponding to a predetermined time. Thus at the end of a long period of time it is possible to ascertain the variation of the phenomenon being measured by the meter or other measuring device 18.

It is noted in this context that although an inking ribbon 31 is employed, it is equally possible to use other types of marking, such as simply physically embossing, heating, electrically sparking or the like.

It is also noted that the electromagnet arrangement may be at the other side of the printing element 5 by changing the repelling of the coil in an attraction.

It will be understood that each of the elements described above, or two or more together may also find a useful application in other types of apparatus differing from the types described above.

While the invention has been illustrated and described as embodied in a recording apparatus, it is not intended to be limited to the details shown since various modifications and structural changes may be made without departing in any way from the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for periodically recording on a recording strip the position of an indicator moveable in an indicating direction, said apparatus comprising:

clock means for periodically generating an electrical impulse;

a printing element moveable between an imprinting position pressing said indicator against said strip and a holding position with said indicator spaced from said strip;

an electromagnet having a moveable coil electrically connected to said clock means and mechanically coupled to said element for displacing said element from said holding to said imprinting position each time said clock means generates one of said impulses;

feed means including a drive roller engaging said strip and rotatable for displacing said strip relative to said printing element; and coupling means including a pawl between said roller and said printing element, said pawl being driven by said printing element for angularly displacing said roller through a predetermined angular increment each time said printing element moves from one of said positions to the other of said positions.

2. The apparatus defined in claim 1, further comprising a supply roll carrying a supply of said strip material and gear means between said supply roll and said drive roller for synchronously rotatimg same.

3. An apparatus for periodically recording on a recording strip the position of an indicator moveable in an indicating direction, said apparatus comprising:

clock means for periodically generating an electrical impulse;

a printing element moveable between an imprinting position pressing said indicator against said strip and a holding position with said indicator spaced from said strip;

actuating means connected between said clock means and said element and energized by said clock means for displacing said element from said holding to said imprinting position each time said clock means generates one of said impulses;

feed means including a drive roller engaging said strip and rotatable for displacing said strip relative to said printing element; and coupling means including a pawl between said roller and said printing element, said pawl being driven by said printing element for angularly displacing said clock means including a frequency divider having one side connected to said actuating means and another side connected to a standard fixed-frequency alternating-current line.

4. An apparatus for periodically recording on a recording strip the position of an indicator moveable in an indicating direction, said apparatus comprising:

clock means for periodically generating an electrical impulse;

a printing element moveable between an imprinting position pressing said indicator against said strip and a holding position with said indicator spaced from said strip;

actuating means connected between said clock means and said element and energized by said clock means for displacing said element from said holding to said imprinting position each time said clock means generates one of said impulses;

feed means including a drive roller engaging said strip and rotatable for displacing said strip relative to said printing element; and coupling means including a pawl between said roller and said printing element, said pawl being driven by said printing element for angularly displacing said roller through a predetermined angular increment each time said printing element moves from one of said positions to the other of said positions, said clock means including a high-frequency oscillator and a frequency divider having one side connected to said actuating means and another side connected to said oscillator.

5. The apparatus defined in claim 4 wherein said frequency divider is adjustable for varying of the rate of said impulses.

* * * * *